US010861080B1

(12) United States Patent
Sanders et al.

(10) Patent No.: US 10,861,080 B1
(45) Date of Patent: Dec. 8, 2020

(54) VISUALIZATION REGION SEARCH REFINEMENT

(71) Applicant: Amazon Technologies, Inc., Reno, NV (US)

(72) Inventors: Adam Callahan Sanders, Seattle, WA (US); Liezel Marie Barraca, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 2009 days.

(21) Appl. No.: 14/034,241

(22) Filed: Sep. 23, 2013

(51) Int. Cl.
*G06Q 30/00* (2012.01)
*G06Q 30/06* (2012.01)

(52) U.S. Cl.
CPC .................. *G06Q 30/0641* (2013.01)

(58) Field of Classification Search
CPC .................................................. G06Q 30/0641
USPC ....................... 705/27.1, 26.1–27.2
See application file for complete search history.

(56) References Cited

U.S. PATENT DOCUMENTS

| | | | | |
|---|---|---|---|---|
| 4,984,155 A * | 1/1991 | Geier | .................. | G06Q 10/087 379/93.12 |
| 6,724,403 B1 * | 4/2004 | Santoro | .................... | G09G 5/14 715/765 |
| 7,249,067 B2 * | 7/2007 | Doerksen | .............. | G06F 17/243 705/1.1 |
| 7,376,907 B2 * | 5/2008 | Santoro | .................. | G06F 3/0481 715/729 |
| 7,720,720 B1 * | 5/2010 | Sharma | .................. | G06Q 30/02 705/26.7 |
| 2003/0160822 A1 * | 8/2003 | Belz | ...................... | G06F 9/4443 715/762 |
| 2005/0261987 A1 * | 11/2005 | Bezos | .................... | G06Q 30/00 705/26.44 |
| 2007/0136643 A1 * | 6/2007 | Kang | ................. | H04N 21/2383 714/776 |
| 2008/0104496 A1 * | 5/2008 | Williams | ............. | G06Q 10/107 715/209 |
| 2008/0243637 A1 * | 10/2008 | Chan | ...................... | G06Q 30/02 705/26.1 |
| 2014/0067597 A1 * | 3/2014 | Kirkby | ............... | G06Q 30/0631 705/26.7 |

* cited by examiner

*Primary Examiner* — Ethan D Civan
(74) *Attorney, Agent, or Firm* — Thomas | Horstemeyer LLP

(57) ABSTRACT

Disclosed are various embodiments for automating the generation of a visualization region for use in visually conveying concepts associated with products or services in an electronic marketplace. In response to a search query, a plurality of concepts that may be beneficial in further refining the search query may be determined and may be represented by a plurality of representative items available in the electronic marketplace. Visual identifiers associated with the representative items may be used in the generation of a visualization region for use in further refining the search query to a particular concept.

20 Claims, 7 Drawing Sheets

VISUALIZATION REGION SEARCH REFINEMENT

BACKGROUND

Electronic marketplaces offer users the ability to search for products or services using keyword searches or by browsing through nodes in an item taxonomy. Certain keywords or nodes in the item taxonomy may not be readily apparent in describing a particular product or service. For example, a potential customer may not be able to distinguish between a "Classic" dress versus a "Timeless" dress, while "Classic" and "Timeless" may be styles of dresses beneficial in assisting the potential customer in the purchase of a dress. Guides that facilitate users with distinguishing between concepts associated with products or services remain manually generated and hard-coded in a user interface.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
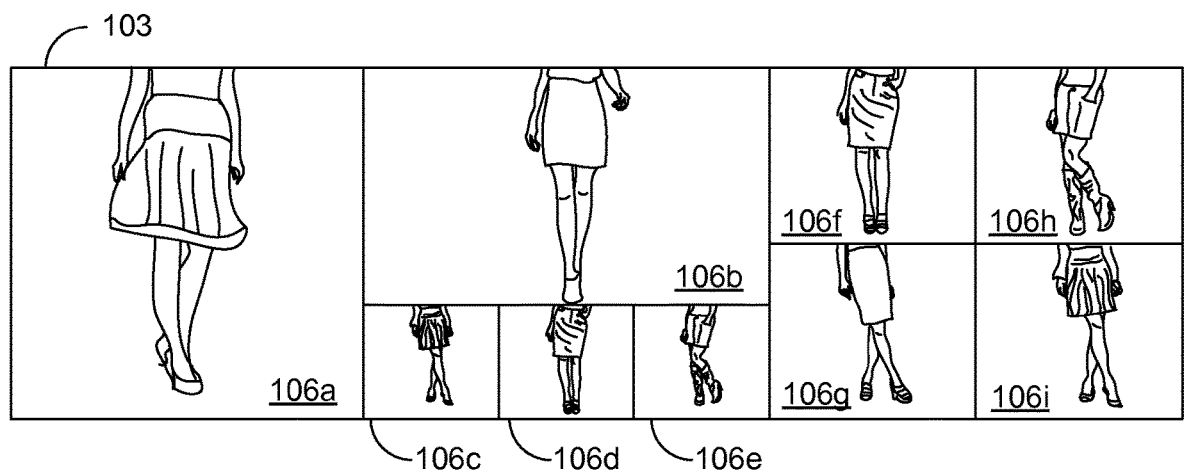
FIG. 1 is a drawing of a visualization region according to various embodiments of the present disclosure.

The present disclosure relates to automating the generation of a visualization region for use in visually conveying concepts associated with products or services. Electronic marketplaces offer users the ability to search for products or services using keyword searches or by browsing nodes in an item taxonomy. Certain keywords or nodes in the item taxonomy, however, may not be readily apparent in describing a product or service to a user. For example, when searching for "dresses," a user may not be familiar with or be able to distinguish among certain types of dresses, such as "traditional dresses," "timeless dresses," or "trendy dresses." Yet, the types of dresses may be relevant in the user's search for a particular product and may be beneficial in locating the particular product in a timely manner.

Similarly, when users have low domain knowledge, their search queries typically include very broad terms such as, for example, "books," "cameras," "music," "clothes," and/or other broad terms. The item search results produced from such an item search may be ultimately unhelpful to a user. As a non-limiting example, the search query "books" may produce a list of items having the word "books" in their respective item titles. In such a case, a user may prefer to navigate a taxonomy of the items within the category of books. With a taxonomy-based navigational aid, the user may select from various sub-categories within the books category, such as various genres of books, fiction books, non-fiction books, etc. However, the sub-categories may not be readily apparent in describing a product or service to a user. For example, a user may not be able to identify the differences between a "traditional dress" sub-category and a "timeless dress" sub-category.

Accordingly, a region of a network page may comprise a visualization component that may be beneficial in assisting a customer in formulating associations of products with various concepts associated with the products. To this end, an image or other visual identifier of a product or service may be shown in association with a concept associated with the product. For example, an image of a representative product associated with the "traditional dress" category may be used to show a customer a representative type of a "traditional dress."

Further, visual identifiers of representative products used in the visualization region may be spatially arranged according to data associated with the representative products. The representative products may be determined by scoring the identified products associated with a respective one of the concepts to identify at least a portion of the representative products that meet a predefined threshold. A spatial arrangement of the images of the representative products meeting the predefined threshold may be determined to generate the visualization region that may be rendered in a user interface such as a network page. The spatial arrangement may be determined according to a probability a viewer of the network page will engage the representative products or other factors, as will be described below.

In the following discussion, a general description of the system and its components is provided, followed by a discussion of the operation of the same.

With reference to FIG. 1, shown is an exemplary visualization region 103 that may be encoded in a user interface according to various embodiments of the present disclosure. As shown in FIG. 1, a visualization region 103 may comprise, for example, a plurality of images 106 or other visual identifiers that may be associated with one or more products or services (hereinafter "items") representative of concepts subject to a search query in an electronic marketplace. In the non-limiting example of FIG. 1, the images 106a-106i may depict representative types of dresses, for example, in response to a user submitting a search query for dresses. Although the images 106 depicted in FIG. 1 are shown in a particular arrangement of rectangular images 106, the visualization region 103 is not so limited. For example, the visualization region 103 may comprise a plurality of visual identifiers of varying sizes, shapes, and spatial arrangements, as may be appreciated. Automating the determination of the images 106 of items representative of a concept, as well as generating the visualization region 103, will be discussed in greater detail below.

Figure 2:
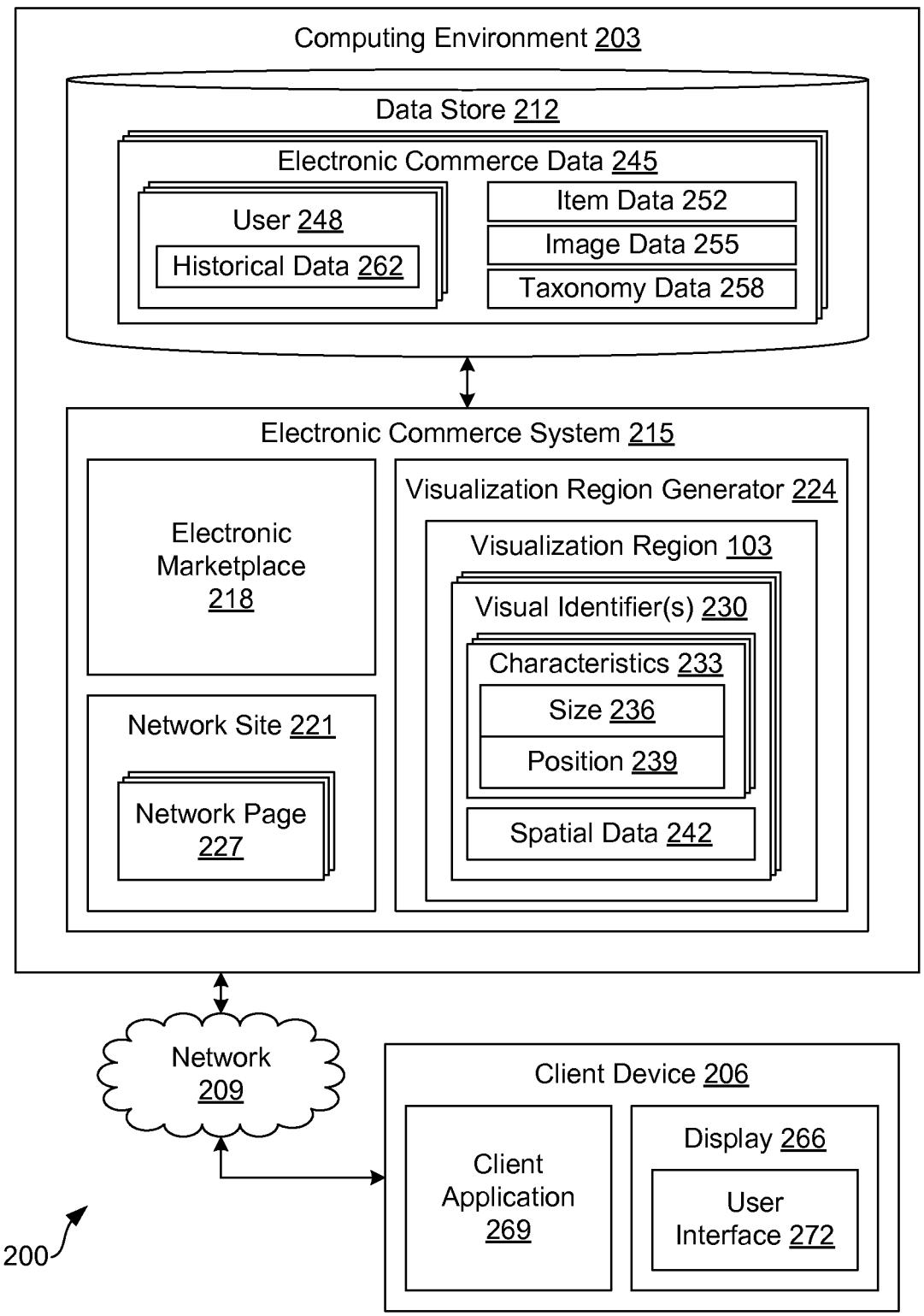
FIG. 2 is a drawing of a networked environment employed to generate the visualization region of FIG. 1 according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce system 215, and other applications, services, processes, systems, engines, or functionality not discussed in detail herein. The electronic commerce system 215 may be executed to facilitate the sale and purchase of items, such as goods and services, over the network 209. As such, the electronic commerce system 215 may provide an electronic marketplace 218, a network site 221, a visualization region generator 224, and other functionality and/or environments not discussed in detail herein.

The electronic marketplace 218 provides a platform for items to be bought and sold over the network 209. The electronic commerce system 215 may generate the network site 221 to provide a network presence for the electronic marketplace 218. To this end, the network site 221 may encode for display at least one network page 227 that facilitates the client device 206 accessing the electronic commerce system 215 and other associated functionality. The network site 221 may include a network page server to serve data such as the network pages 227 and other data to client devices 206 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The visualization region generator 224 may be executed to generate and/or process various data associated with one or more visualization regions 103. As will be further discussed, the visualization regions 103 may present visual depictions of attributes, keywords, concepts, classifications, and/or categories associated with products or services offered for consumption via the electronic commerce system 215. In this sense, the visualization region 103 may be considered a "widget" that presents information, such as images, that may facilitate a user's experience interacting with the electronic commerce system 215.

Associated with each visualization region 103 may be one or more visual identifiers 230 that present a depiction of one or more representative items, attributes, concepts, classifications, and/or categories. For example, a visual identifier may comprise an image that may be beneficial in distinguishing between certain attributes, concepts, classifications, or categories related to a particular search query. Thus, the visual identifiers 230 in various embodiments may be embodied in the form of digital images capable of being rendered in a user interface. As a non-limiting example, a visual identifier may comprise a digital file in a Joint Photographic Experts Group (JPEG), Graphics Interchange Format (GIF), Portable Network Graphics (PNG), Bitmap (BMP), Tagged Image File Format (TIFF), ShockWave™ Flash (SWF), or any other format.

Associated with each visual identifier 230 may be one or more characteristics 233 corresponding to the respective visual identifier 230. For example, the characteristics 233 may be the size 236, position 239, and/or other characteristics 233 of the visual identifier 230. The size 236 of the visual identifier 230 may be a value, such as a length, width, area, etc. The size 236 may be expressed in terms of a specific number, in relation to other visual identifiers 230, in relation to a device on which the visualization region 103 is rendered, or in other ways. It is emphasized that other characteristics 233 may be associated with the visualization region 103 as well. For example, a visualization region 103 may have characteristics 233 such as a size 236 and/or a position 239 useful in encoding the visualization region 103 in a user interface.

The position 239 may be a location of a particular visual identifier 230 relative to the visualization region 103 and/or the user interface in which the visual identifier 230 is encoded. Similar to the size 236 of the visual identifiers 230, the position 239 may be expressed in various ways. For example, the position 239 may be expressed in relation to a device on which the visualization region 103 is displayed in a user interface relative to other content of the user interface.

Also associated with the visualization region 103 may be spatial data 242 used in identifying an arrangement and/or size of the one or more visual identifiers 230 relative to the visualization region 103. For example, in FIG. 1, the visual identifier 230 of item 106a has a larger size than the visual identifier 230 of item 106c and is located to the left of the visual identifier 230 of item 106c.

Referring back to FIG. 2, the data stored in the data store 212 includes, for example, electronic commerce data 245, and potentially other data. Electronic commerce data 245 may comprise, for example, user data 248 associated with users of the electronic commerce system 215 as well as item data 252, image data 255, and/or taxonomy data 258. For example, user data 248 may include various historical data 262 that describes past user behavior with respect to searching, browsing, and/or purchasing items in the electronic commerce system 215.

The item data 252 may include, for example, item titles, item images, item descriptions, item prices, item quantities, item reviews, item categories, related items, accessory items, compatible parts for that item, and/or any other data that may be used to describe or otherwise relate to items that are searchable by the electronic commerce system 215. Further, the item data 252 may include data describing the quantity of sales of particular items.

The image data 255 may comprise, for example, digital images or other visual identifiers that depict an item available for purchase or consumption in the electronic marketplace 218. Digital images may comprise, for example, pictures taken of a respective item from various angles. Alternatively, digital images may comprise, for example, computer generated images that visually represent a respective item.

Taxonomy data 258 may comprise, for example, data describing one or more logical taxonomies for categorizing items available in the electronic marketplace 218. Each taxonomy described in taxonomy data 258 may be characterized, for example, by a hierarchical data structure such as a tree. Thus, a taxonomy may be said to have a plurality of nodes, wherein each node may link to a plurality of child nodes, each of which may in turn link to further child nodes. A starting point in a taxonomy may be called a root node, while nodes having no child nodes are said to be leaf nodes. Child nodes, grandchild nodes, etc. of a root node may also be called descendants of the root node. Each node described within taxonomy data 258 may be thought of as a category of items that relate to one another in a predefined way. Each successive child node may more specifically define a relationship among items.

As a non-limiting example, a root node of a taxonomy in taxonomy data 258 may describe all departments of an online retailer, for example, books, digital downloads, electronics, and other departments. Each of the departments, or nodes, is associated with a plurality of items. A node associated with digital downloads in the taxonomy may be associated with child nodes including, for example, video downloads, audio downloads, game downloads, and/or other digital downloads. Each of these child nodes, or categories, may be further subdivided if necessary. For example, the audio downloads category node may be further subdivided by genre, such as classical, alternative rock, country, hip-hop, and so on. Ultimately, a node, or category, is associated with one or more items. It is further understood that an item may be associated with a plurality of categories and/or a plurality of taxonomies as desired.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client device 206 may be configured to execute applications beyond the client application 269 such as, for example, email applications, social networking applications, word processors, spreadsheets, and/or other applications.

Next, a general description of the operation of the various components of the networked environment 200 is provided. To begin, it may be assumed that a user has initiated a search query on the client device 206 to identify an item in the electronic commerce system 215. As a non-limiting example, a user may have submitted a search query by providing a search string in a search form in a user interface 272 provided to the user by the electronic commerce system 215. Alternatively, a user may have navigated through an item taxonomy by engaging one or more nodes in the item taxonomy. To this end, a search query may be parsed to broadly or narrowly identify products or services subject to a search by the user. For example, by searching for "movies," it may be determined from the search query that a user is attempting to navigate the electronic marketplace 218 to potentially purchase a movie or similar item.

The visualization region generator 224 may identify one or more concepts related to the item subject to the search query. Concepts may comprise, for example, various categories, attributes, qualities, and/or features associated with an item available or in-stock in the electronic marketplace 218. As a non-limiting example, a search query may have been identified in which a user has searched for "movies." To this end, concepts may comprise, for example, genres of movies that may be useful in refining or filtering search results to a particular movie genre.

In another example, a search query may have been identified in which a user has searched for "dresses." In this example, concepts may comprise, for example, styles of dresses that may be useful in refining or filtering search results to a particular type of dress. In yet another example, a search query may have been identified in which a user has searched for "flash drives." Concepts may comprise, for example, different memory capabilities of the flash drives subject to the search. Concepts may be automatically determined by the visualization region generator 224 by identifying sub-nodes of the item subject to the search in the item taxonomy, analyzing item descriptions using natural language processing, and/or by other methods.

The visualization region generator 224 may determine representative items in the electronic marketplace 218 by identifying candidate items, scoring the candidate items, and determining which candidate items meet a predefined threshold. To this end, items representative for each of the concepts identified above may be determined that may assist a user in filtering and/or refining the user's search. For example, movies representative of a "horror" genre may be identified and scored according to which of the movies are more likely a representative of the genre recognizable by a user. Similarly, dresses representative of a "Classic" style may be identified and scored according to which of the dresses are more likely a recognizable representative of the "Classic" style. Thus, determining the score may be based at least in part on, for example, a popularity of an item relative to its respective concept based on the item's view history, purchase history, and/or other information.

A respective concept may be depicted and visually described in the visualization region 103 using a visual identifier (e.g., an image 106) of one or more of the items representative of the respective concept. For example, a digital image of a dress available in the electronic marketplace 218 may be used to represent a "Classic" dress concept. To this end, a visualization region 103 may comprise multiple visual identifiers 230, each visual identifier 230 describing a particular concept. A size 236, a position 239, and a spatial arrangement for each of the visual identifiers 230 may be determined and a visualization region 103 may be generated.

The visualization region generator 224 may encode the generated visualization region 103 in a user interface 272 such as a network page 227 capable of transmission over the network 209 to the client device 206. Upon receipt of the network page 227 by the client device 206, the network page 227 may be rendered in the display 266.

Further, the network page 227 may be encoded to detect and determine whether the user of the client device 206 has engaged or manipulated one or more dynamic portions of the visualization region 103. For example, it may be detected when a user engages a portion of the visualization region 103, by detecting a location of a user's cursor controlled by an input device such as a mouse or keyboard. In the event it is detected that a user has manipulated a portion of the visualization region, an action or event may be initiated that alters the visualization region 103 the network page 227. Initiating an action or event with respect to the visualization region 103 will be described in greater detail below.

Figure 3A:
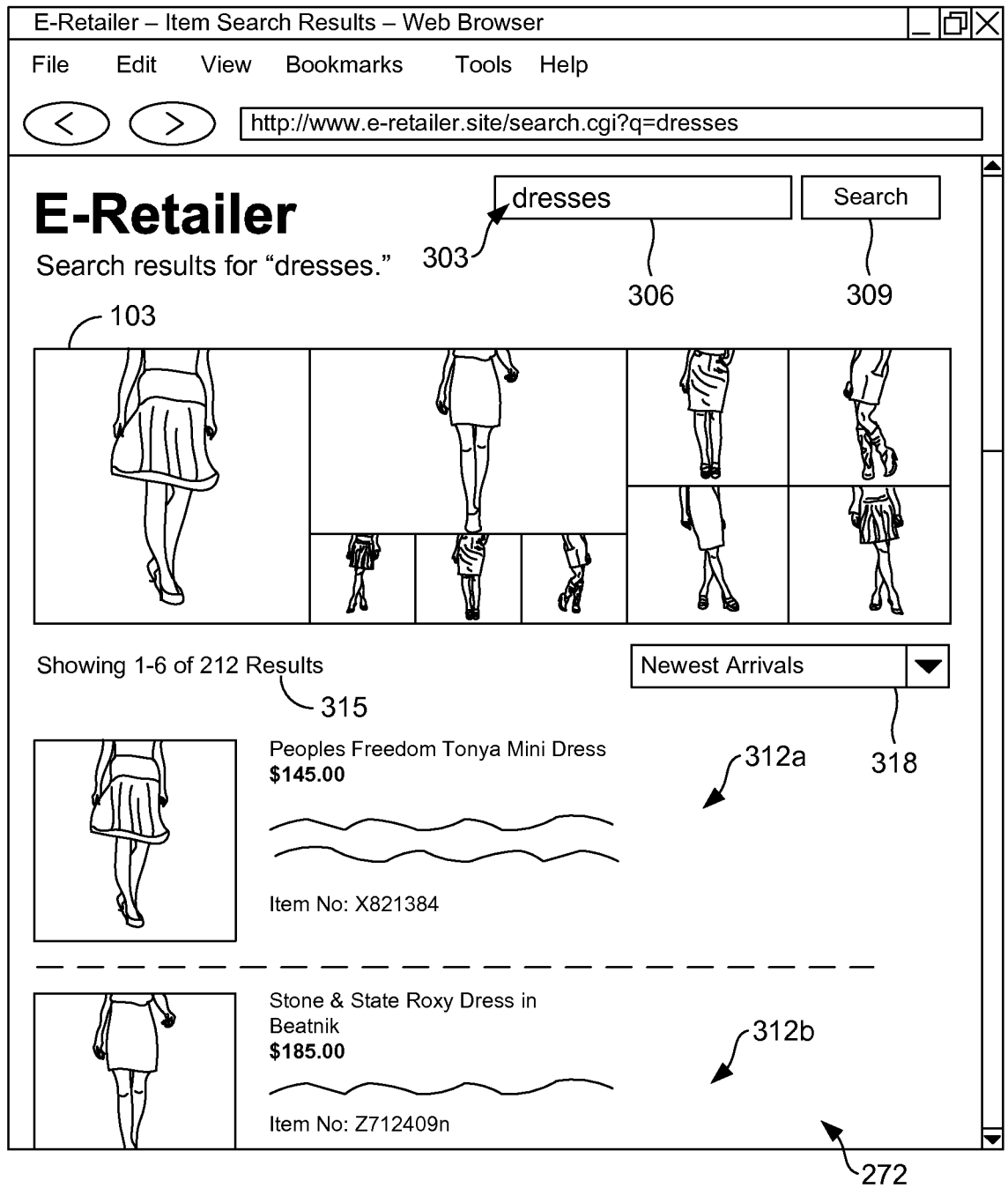
FIGS. 3A-C are pictorial diagrams of example user interfaces rendered by a client device in the networked environment of FIG. 2 according to various embodiments of the present disclosure.

Referring next to FIG. 3A, shown is a pictorial diagram of an example user interface 272 rendered by a client device 206 (FIG. 2) in the networked environment of FIG. 2 according to various embodiments of the present disclosure. As shown in FIG. 3A, a user may conduct a search for an item in an electronic marketplace 218 (FIG. 2) by entering a search string 303 in a search form comprising, for example, a search box 306 and a submit button 309. In the non-limiting example of FIG. 3A, a search for "dresses" may provide search results comprising items available in the electronic marketplace 218 fitting this search criteria. As can be appreciated, the search results may provide the user with items associated with the search query, as shown by returned items 312a and 312b.

As described above, a generic search for "dresses" may provide a vast number of items available in the electronic marketplace 218, as depicted by a search results quantity 315. Although a user may organize the search results using, for example, a sort component 318, it remains difficult for the user to refine or filter the search results without a sophisticated level of awareness of concepts associated with items subject to the search query.

Accordingly, the visualization region 103 may comprise visual identifiers 230 of items representative of particular concepts associated with the search query. The visual identifiers 230 may be manipulated or engaged to refine or otherwise filter the search results according to the concept associated with the manipulated visual identifier 230.

In the non-limiting example of FIG. 3A, the visualization region 103 may comprise visual identifiers 230 arranged as a "tree map," displaying hierarchical concepts as a set of rectangles nested in the visualization region 103. Each visual identifier 230 may represent a concept that may be used to further refine the user's search for "dresses." For example, in FIG. 3A, concepts may be represented as styles of dresses, wherein each style of dress is represented by a visual identifier 230 associated with a representative item in the electronic marketplace 218.

In the non-limiting example of FIG. 3A, a size 236 and a position 239 of the visual identifiers 230 representing a particular concept may be determined. According to one embodiment, the size 236 and position 239 may be determined based at least in part on a probability a respective viewer or user 248 may engage the visual identifier 230 utilizing, for example, historical data 262 of the user 248, wherein visual identifiers 230 with a higher probability of engagement are larger than visual identifiers 230 with a lower probability of engagement. According to another embodiment, the size 236 and position 239 may be determined based at least in part on a probability all users 248 of a user interface may engage the visual identifier 230, wherein visual identifiers 230 with a higher probability of engagement are larger than visual identifiers 230 with a lower probability of engagement. Similarly, the position 239 may be determined based at least in part on a probability a user may engage the visual identifier 230, wherein visual identifiers 230 with a higher probability of engagement are located to the left of visual identifiers 230 with a lower probability of engagement. The probability of engagement may be described as, for example, a likelihood of a conversion, purchase, or any other downstream event. The arrangement of the visual identifiers may be configurable by an administrator thus may vary, as can be appreciated.

Figure 3B:
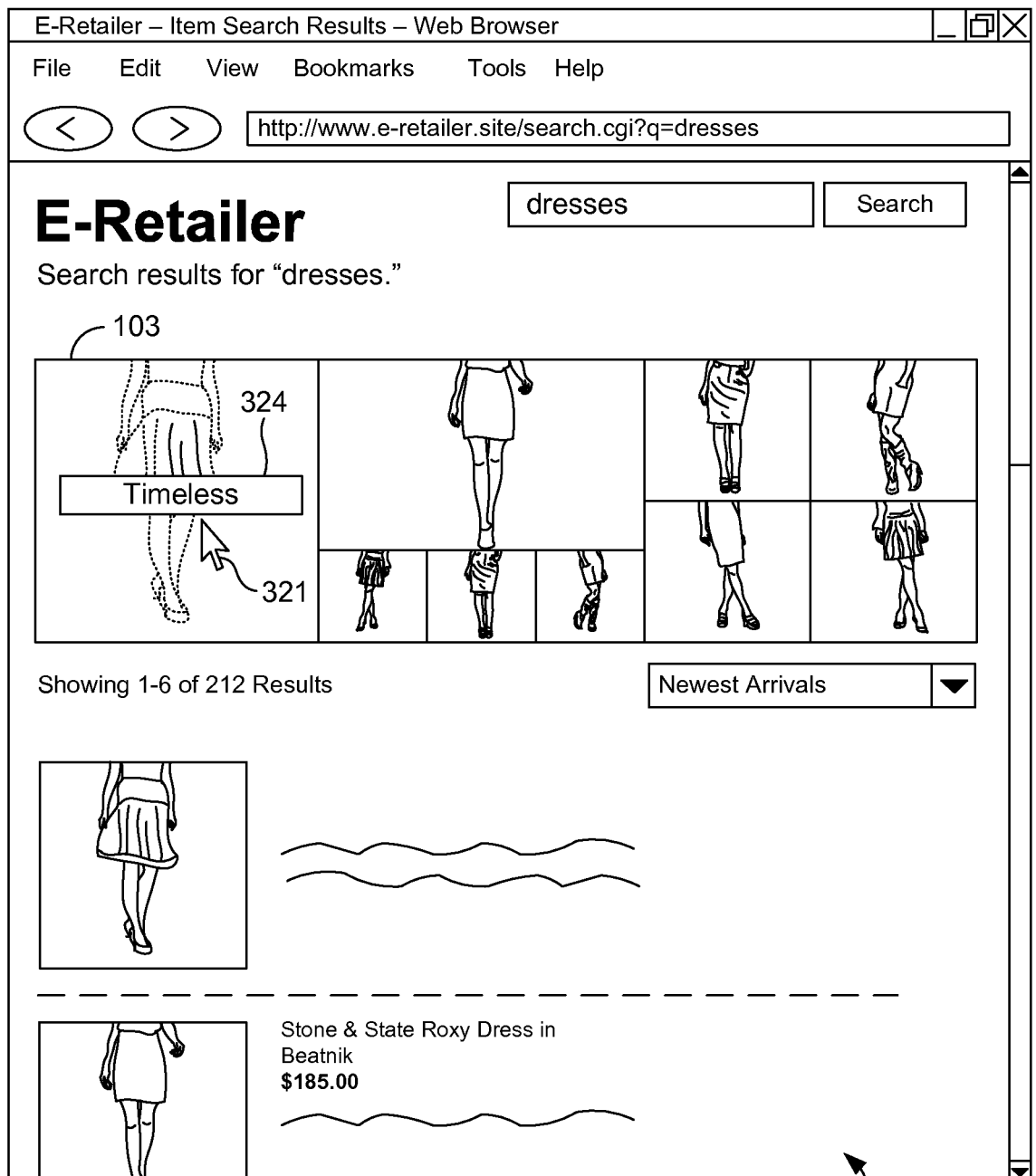
Figure 3C:
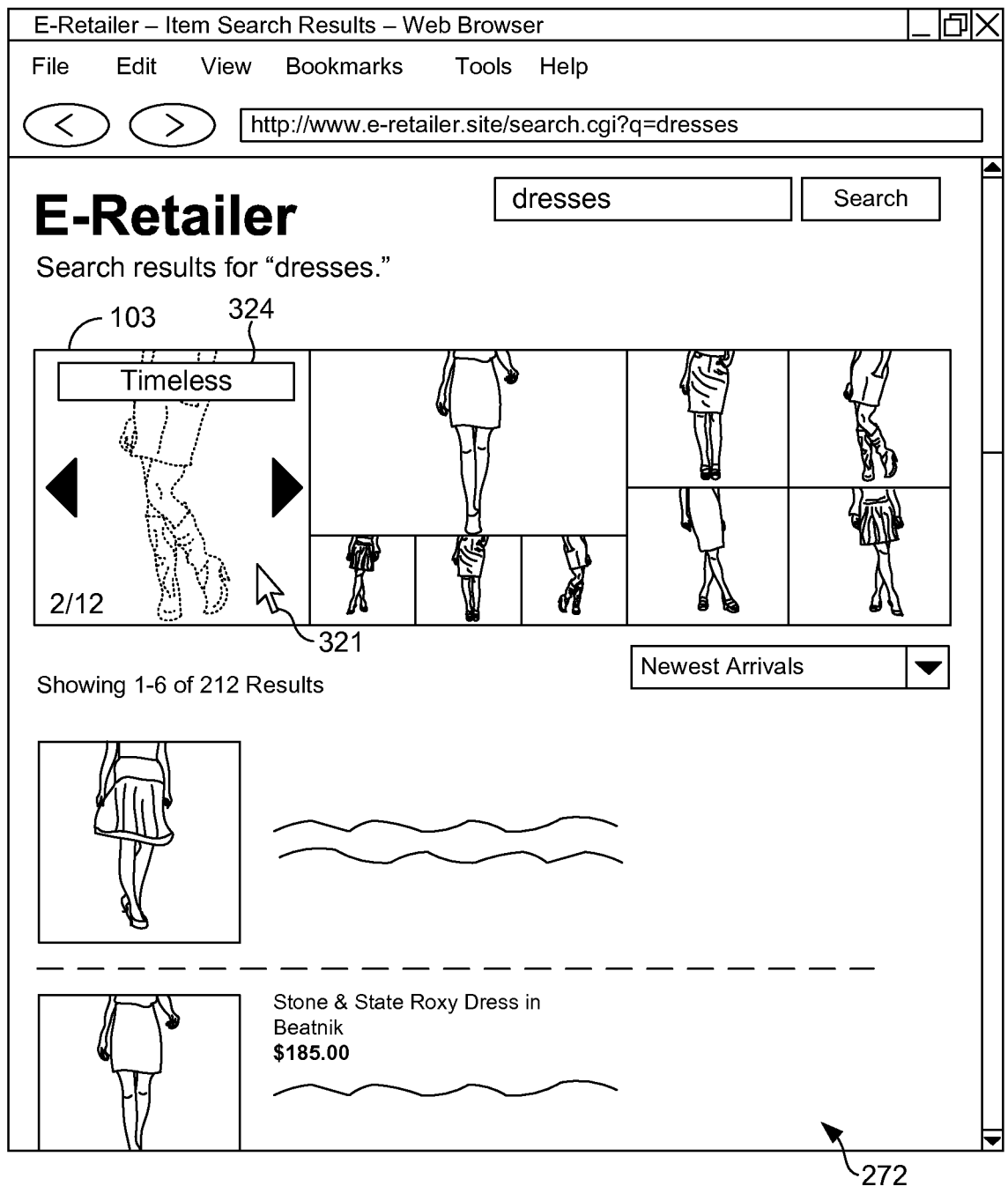

Turning now to FIG. 3B, shown is a pictorial diagram of an example user interface 272 rendered by a client device 206 (FIG. 2) in the networked environment of FIG. 2 according to various embodiments of the present disclosure. In the non-limiting example of FIG. 3B, a user may engage visual identifiers 230, as described above, using various input devices in communication with the client device 206 (e.g., via a mouse or keyboard). The visual identifiers 230 may be dynamic regions in the user interface 272 capable of initiating an action or an event upon manipulation by a user. Engaging may comprise, for example, hovering over the visual identifier 230 with a cursor 321, "clicking" on the visual identifier 230 with the cursor 321, and/or other means of user engagement. For example, in FIG. 3B, as a user places a cursor 321 over a particular visual identifier 230, a dynamic portion of the visualization region 103 may initiate an event. In the non-limiting example of FIG. 3B, an event may comprise, for example, displaying a label 324 identifying the concept associated with the visual identifier 230 (i.e., the "Timeless" dress category) subject to the engagement.

As can be appreciated, actions or events may vary and may be configurable by an administrator of the visualization region generator 224 (FIG. 2). For example, an action or an event may comprise changing the size 236 and/or position 239 of the visual identifier 230 describing a particular concept or features. Modifying the appearance of the user interface 272 may be accomplished using, for example, Flash™, Java™, AJAX, JQUERY, and/or any other means.

Moving on to FIG. 3O, shown is a pictorial diagram of an example user interface rendered by a client device 206 (FIG. 2) in the networked environment of FIG. 2 according to various embodiments of the present disclosure. As described above with respect to FIG. 3B, an action or an event may comprise changing the size 236 and/or position 239 of the visual identifier 230 describing a particular concept or features. In the non-limiting example of FIG. 3O, as a user engages a visual identifier 230 representing a particular concept (e.g., via cursor 321), the visual identifier 230 may dynamically change, showing other representative items representing a particular concept. To this end, the dynamic region may perform a "carousel" effect, alternating the items shown in the nested rectangle in the manipulated portion of the visualization region 103. For example, the "Traditional" dress concept may have 12 representative items associated with the concept. As a user engages the visual identifier 230, visual identifiers 230 of the representative item may be manually and/or automatically changed, permitting the user to see many representative items in a short duration.

As may be appreciated, as a user further engages the particular visual identifier 230 representing a particular concept (e.g., by clicking or double-clicking over the visual identifier 230), a series of one or more additional user interfaces 272 may be rendered further refining the search query according to the manipulated concept. For example, by clicking on a visual identifier 230 representing the "Traditional" dress concept, an additional user interface 272 may be generated refining the search results to only items associated with the "Traditional" dress concept. Thus, be engaging a particular visual identifier 230, a user is able to refine or otherwise filter the search results using a visual reference.

Figure 4:
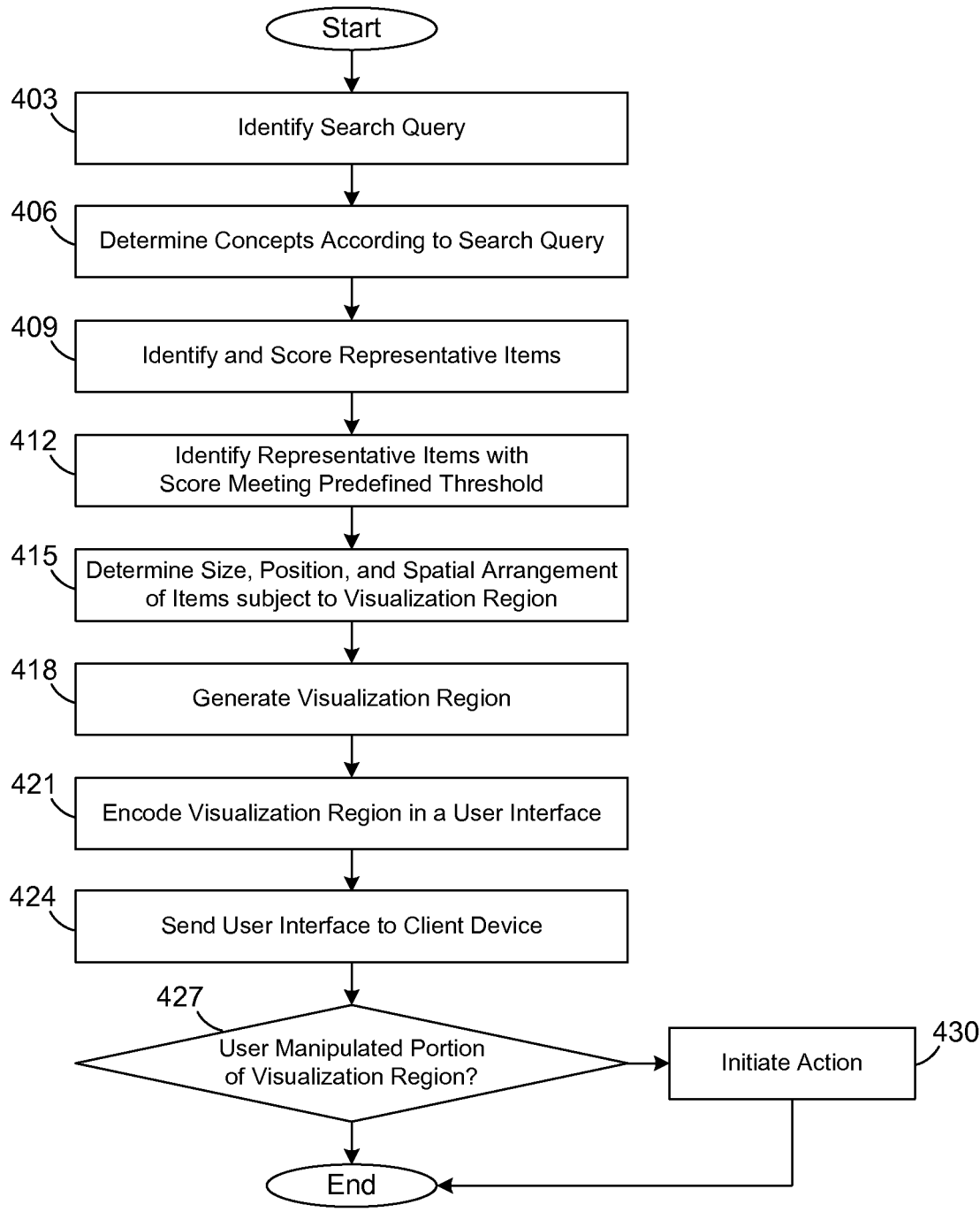
FIG. 4 is a flowchart illustrating one example of functionality implemented as portions of a visualization region generator executed in a computing environment in the networked environment of FIG. 2 according to various embodiments of the present disclosure.

Referring next to FIG. 4, shown is a flowchart that provides one example of the operation of a portion of the visualization region generator 224 according to various embodiments. It is understood that the flowchart of FIG. 4 provides merely an example of the many different types of functional arrangements that may be employed to implement the operation of the portion of the visualization region generator 224 as described herein. As an alternative, the flowchart of FIG. 4 may be viewed as depicting an example of elements of a method implemented in the computing environment 203 (FIG. 2) according to one or more embodiments.

Beginning with 403, a search query initiated by a user of the electronic commerce system 215, or like system, is identified. For example, a user may have submitted a search query by interacting with search box 306 (FIG. 3A), typing one or more words in the search box 306 and engaging search button 309 (FIG. 3A). Alternatively, a user may have navigated through the item taxonomy by engaging one or more browse nodes in the item taxonomy. To this end, a search query may be parsed to broadly or narrowly identify products or services subject to a search by the user. For example, by searching for "dresses," it may be determined from the search query that a user is attempting to navigate the electronic marketplace 218 to potential purchase a dress or similar item.

In another embodiment, a user may have engaged a search for an item, for example, by capturing an image of the item using an application executed on a device, wherein the application is configured to initiate a search for particular items within the image. For example, a user may use a mobile application to take a picture of a dress in a store. The mobile application may use image processing to identify dresses similar to the picture within an electronic marketplace. Similarly, in an alternative embodiment, a user may have engaged a search for an item, for example, by recording sound of audio content using an application executed on a device, wherein the application is configured to initiate a search for the audio content, or similar audio content, in the electronic marketplace (e.g., an audio file available for purchase or consumption) within the image. For example, a user may use a mobile application to record a small portion of a song playing on the radio or in a store. The mobile application may use audio processing to identify the particular song recorded and may identify a digital content item of the song available for purchase or consumption within the electronic marketplace.

Next, in 406, one or more concepts may be determined according to an item subject to the search query, identified in 403. Concepts may comprise, for example, categories, attributes, qualities, and/or features associated with the item. As a non-limiting example, a search query may have been identified in which a user has searched for "movies." Concepts may comprise, for example, genres of movies that may be useful in refining or filtering search results to a particular movie genre. In another example, a search query may have been identified in which a user has searched for "dresses." Concepts may comprise, for example, styles of dresses that may be useful in refining or filtering search results to a particular type of dress. In yet another example, a search query may have been identified in which a user has searched for "flash drives." Concepts may comprise, for example, different memory capabilities of the flash drives subject to the search. Concepts may be automatically determined by the visualization region generator 224 by identifying subnodes of the item subject to the search in the item taxonomy, analyzing item descriptions using natural language processing to identify features of the item, and/or by other methods.

In 409, the representative items for each of the concepts identified in 406 may be identified and/or scored. For example, movies representative of a "horror" genre may be identified and scored according to which of the movies are more likely a recognizable representative of the genre. Similarly, dresses representative of a "Classic" style may be identified and scored according to which of the dresses are more likely a recognizable representative of the "Classic" style. Determining the score may be based at least in part on, for example, a popularity of an item relative to its respective concept based on the item's view history, purchase history, and/or other information. Additionally, determining the score may be based at least in part on, for example, historical data 262 (FIG. 2) associated with the user 248 (FIG. 2) conducting the search query. For example, the purchase history and/or browse history of a user 248 may be employed to determine representative items that the user is more likely to purchase.

In box 412, the representative items having a score meeting a predefined threshold may be selected as representative items to be used in the visualization region 103, as will be described in greater detail below. A predefined threshold, for example, may be a numeric value predefined by an administrator of the system. In 415, a size 236 (FIG. 2), a position 239 (FIG. 2), and a spatial arrangement may be determined for each of the visual identifiers 230 relative to a visualization region 103. In 418, the visualization region may be generated according to the sizes 236 and positions 239 of the visual identifiers 230.

In 421, the visualization region may be encoded in a user interface 272 (FIG. 2). According to various embodiments, a user interface 272 may comprise, for example, a network page 227 capable of transmission over the network 209 (FIG. 2) to the client device 206 (FIG. 2). In 424, the user interface 272 may be sent over network 209 to the client device 206 (FIG. 2) for rendering in the display 266 (FIG. 2).

In 427, it may be determined whether the user has manipulated or otherwise engaged a portion of the visualization region 103. As described above, it may be detected when a user manipulates a portion of the visualization region 103, for example, by detecting a location of a user's cursor controlled by an input device such as a mouse or keyboard. Similarly, manipulation of the portion of the visualization region 103 may be determined by devices capable of measuring a user's voice command or body gesture. In the event it is detected that a user has engaged a portion of the visualization region, an action or event may be initiated, as shown in 430. In one embodiment, initiating an event may comprise rendering a "carousel" of items representative of the concept being manipulated, permitting a user to alternate the items shown in a respective portion of the visualization region 103. In another embodiment, initiating an action or an event may comprise adjusting the size of a respective visual identifier 230, for example, by increasing or decreasing the size of the respective visual identifier 230 relative to the other visual identifiers 230. In another embodiment, initiating an action or an event may comprise changing the visual identifier 230 to another visual identifier 230, such as a visual identifier 230 showing a different view of the same item representative of the concept.

Figure 5:
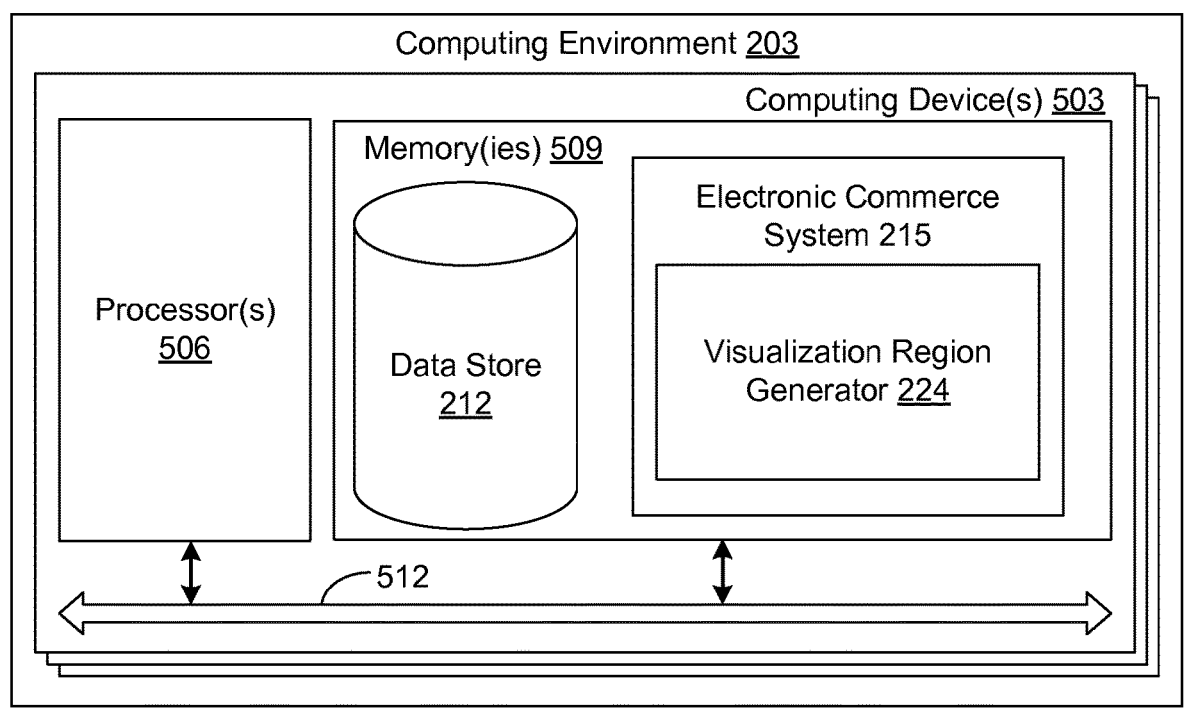
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 are the electronic commerce system 215, the visualization region generator 224, and potentially other applications. Also stored in the memory 509 may be a data store 212 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although the electronic commerce system 215, the visualization region generator 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the visualization region generator 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215 and the visualization region generator 224, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215 and the visualization region generator 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 503, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, causes the at least one computing device to:
   in response to a search query performed in an electronic marketplace, determine a plurality of features associated with an item subject to the search query capable of further refining the search query to a particular one of the plurality of features;
   identify a plurality of representative items available in the electronic marketplace for individual ones of the plurality of features, wherein individual ones of the plurality of representative items are depicted in corresponding ones of a plurality of images stored in a memory, the plurality of images being representative of a respective one of the plurality of features;
   score the identified plurality of representative items to determine at least a portion of the plurality of representative items meeting a predefined threshold indicative of the portion of the plurality of representative items being representative of at least one of the plurality of features;
   determine a spatial arrangement of the plurality of images of the plurality of representative items meeting the predefined threshold for inclusion in a visualization region of a user interface, wherein the spatial arrangement is determined according to a probability a viewer of the user interface will manipulate at least one of the plurality of representative items; and
   generate user interface data that, when rendered by a client device, causes a display of the visualization region in the user interface, wherein a manipulation of the at least one of the plurality of representative items in the visualization region further refines the search query.

2. The non-transitory computer-readable medium of claim 1, wherein the program code that, when executed, causes the at least one computing device to determine the spatial arrangement further comprises program code that, when executed, causes the at least one computing device to determine a size for each of the plurality of images.

3. The non-transitory computer-readable medium of claim 1, wherein a client-side application rendering the user interface automatically initiates an action upon the manipulation of the at least one of the plurality of representative items.

4. A system, comprising:
   at least one computing device; and
   program instructions that, when executed by the at least one computing device, cause the at least one computing device to:
     in response to a search query performed in an electronic marketplace, determine a plurality of features associated with an item subject to the search query capable of further refining the search query to a particular one of the plurality of features;
     identify a plurality of representative items available in the electronic marketplace for individual ones of the plurality of features, wherein individual ones of the plurality of representative items are depicted in corresponding ones of a plurality of images stored in a memory, the plurality of images being representative of a respective one of the plurality of features;

score the identified plurality of representative items to determine at least a portion of the plurality of representative items meeting a predefined threshold indicative of the portion of the plurality of representative items being representative of at least one of the plurality of features;

determine a spatial arrangement of the plurality of images of the plurality of representative items meeting the predefined threshold for inclusion in a visualization region of a user interface; and generate user interface data that, when rendered by a client device, causes a display of the visualization region in the user interface, wherein a manipulation of the at least one of the plurality of representative items in the visualization region further refines the search query.

5. The system of claim 4, wherein the program instructions that, when executed, causes the at least one computing device to determine the spatial arrangement further comprise program instructions that, when executed, cause the at least one computing device to determine a size for each of the plurality of images.

6. The system of claim 4, wherein a client-side application rendering the user interface automatically initiates an action upon the manipulation of the at least one of the plurality of representative items.

7. The system of claim 6, wherein the action further comprises replacing a respective one of the plurality of images with an alternative image in a portion of the user interface in which the respective one of the plurality of portions resides.

8. The system of claim 6, wherein the action further comprises displaying a label comprising at least one of the plurality of features on top of the at least one of the plurality of representative items upon a hovering of a cursor near the at least one of the plurality of representative items.

9. The system of claim 6, wherein the action further comprises modifying a size of a corresponding image for a manipulated one of the plurality of representative items.

10. The system of claim 6, wherein the action further comprises modifying a position of a corresponding image for a manipulated one of the plurality of representative items in the user interface.

11. The system of claim 4, wherein the spatial arrangement is determined according to a probability a viewer of the user interface will engage at least one of the plurality of representative items.

12. The system of claim 4, wherein the user interface further comprises a network page configured for rendering by a client-side application executable on a client device.

13. A method, comprising:
in response to a search query performed in an electronic marketplace, determining, by at least one computing device, a plurality of features associated with an item subject to the search query capable of further refining the search query to a particular one of the plurality of features;

identifying, by the at least one computing device, a plurality of representative items available in the electronic marketplace for individual ones of the plurality of features, wherein individual ones of the plurality of representative items are depicted in corresponding ones of a plurality of images stored in a memory, the plurality of images being representative of a respective one of the plurality of features;

scoring, by the at least one computing device, the identified plurality of representative items to determine at least a portion of the plurality of representative items meeting a predefined threshold indicative of the portion of the plurality of representative items being representative of at least one of the plurality of features;

determining, by the at least one computing device, a spatial arrangement of the plurality of images of the plurality of representative items meeting the predefined threshold for inclusion in a visualization region of a user interface, wherein the spatial arrangement is determined according to a probability a viewer of the user interface will manipulate at least one of the plurality of representative items; and generating, by the at least one computing device, user interface data that, when rendered by a client device, causes a display of the visualization region in the user interface, wherein a manipulation of the at least one of the plurality of representative items in the visualization region further refines the search query.

14. The method of claim 13, wherein a client-side application rendering of the user interface initiates an action in response to a manipulation of a respective one of the plurality of representative items in the visualization region.

15. The method of claim 14, wherein the action further comprises replacing an image for the respective one of the plurality of representative items with an alternative image in a manipulated portion of the user interface.

16. The method of claim 14, wherein the action further comprises displaying a label comprising at least one of the plurality of features on top of the at least one of the plurality of representative items upon a hovering of a cursor near the at least one of the plurality of representative items.

17. The method of claim 14, wherein the action further comprises modifying a size of an image of the respective one of the plurality of the plurality of representative items in the visualization region.

18. The method of claim 14, wherein the action further comprises modifying a position of an image of the respective one of the plurality of the plurality of representative items in the visualization region.

19. The method of claim 14, wherein the user interface further comprises a network page configured for rendering by a client-side application executable on a client device.

20. The method of claim 13, wherein the visualization region comprises the plurality of images of the plurality of representative items arranged as a tree map that hierarchically displays the plurality of features as a set of rectangles nested in the visualization region.

* * * * *